Jan. 19, 1971 W. H. STARNES, JR 3,557,232
AUTOXIDATION INHIBITION WITH CHLORINATED HYDROCARBONS
Filed Nov. 13, 1968 2 Sheets-Sheet 1

INVENTOR.
WILLIAM H. STARNES, JR.,
BY
ATTORNEY.

United States Patent Office 3,557,232
Patented Jan. 19, 1971

3,557,232
AUTOXIDATION INHIBITION WITH
CHLORINATED HYDROCARBONS
William H. Starnes, Jr., Baytown, Tex., assignor to
Esso Research and Engineering Company
Filed Nov. 13, 1968, Ser. No. 775,256
Int. Cl. C07c 7/08, 7/18; B01i 1/16
U.S. Cl. 260—666.5    10 Claims

ABSTRACT OF THE DISCLOSURE

The metal-catalyzed autoxidation of organic substrates is inhibited by certain chlorinated hydrocarbons. The chlorinated hydrocarbons together with phenols are strongly synergistic as inhibitors for the metal-catalyzed autoxidation of hydrocarbons.

BACKGROUND OF THE INVENTION

During manufacture, storage or end-use applications, many organic products become contaminated with metal ions. Many metal ions are catalysts for autoxidation. Heretofore, the metal-catalyzed autoxidation has ordinarily been prevented by addition of a combination of inhibitors such as hcelating agents (as metal scavengers), hindered phenols (as free radical chain stoppers), trivalent phosphorus compounds (as peroxide decomposers), and the like.

The present invention is directed to the finding that chlorinated hydrocarbons such as triphenylmethyl chloride, benzhydryl chloride, benzyl chloride, t-butyl chloride, allyl chloride, 1-chloropentane and the like are excellent inhibitors for the metal-catalyzed autoxidation of hydrocarbons.

SUMMARY OF THE INVENTION

The present invention may be briefly desribed as an organic substrate which is contaminated with metal ions that are capable of acting as autoxidation catalysts, and which contains a stabilizing amount of a chlorinated hydrocarbon selected preferably from the group of triarylmethyl chlorides. More particularly, the present invention is directed to the inhibition of the metal-catalyzed autoxidation of hydrocarbons by the addition of a chlorinated hydrocarbon in an amount at least equal stoichiometrically to the amount of metal ion present in the hydrocarbon. In its more specific aspects, the invention is directed to the synergistic system of a chlorinated hydrocarbon and a phenol as a system for inhibiting the metal-catalyzed autoxidation of hydrocarbons.

DESCRIPTION OF THE PREFERRED EMBODIMENTS

Figure 1:
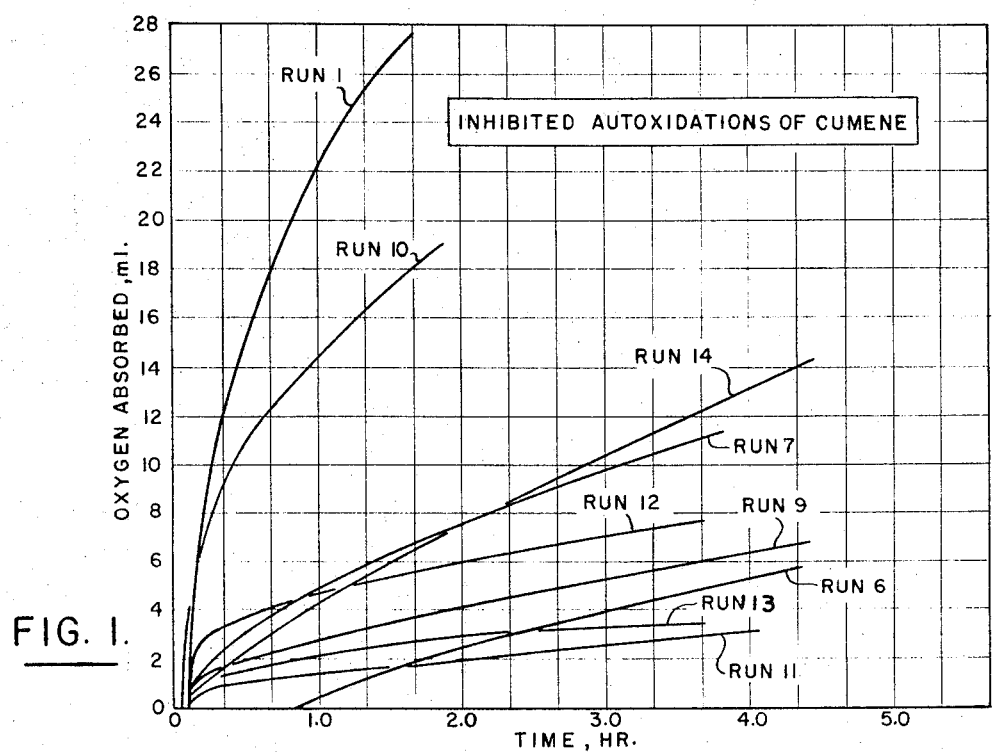
FIGS. 1, 2 and 3 are oxidation rate curves for specific compounds of the present invention in cumene or 4-vinylcyclohexene.

Organic substrates, both liquid and solid, may become contaminated with metal ions which catalyze autoxidation. Metals such as titanium, vanadium, chromium, manganese, iron, cobalt, nickel, copper, molybdenum, tungsten and lead act as catalysts in the autoxidation of organic substrates. In the storage of liquid organic materials such as aromatic or olefinic hydrocarbons, the metal ion is most likely to come from the metallic storage vessel. Occasionally the metal ion is present due to its introduction during processing or to the use of the metal as a catalyst. In most instances the metal is present as a metal compound in the substrate. The polyolefin polymers produced using a Ziegler polymerization catalyst in a manner well known to the art are examples of solid hydrocarbons contaminated with metal ions. Thus, solid hydrocarbon substrates may be suitably exemplified by polyethylene, polypropylene, polybutene-1, ethylene-propylene copolymers and the like, which are solid polymers having molecular weights in the range from about 10,000 to 1,000,000 or more.

The chlorinated hydrocarbons which are useful inhibitors in the present invention are aralkyl chlorides, allyl chlorides, or alkyl chlorides. Any chlorinated hydrocarbon, containing one or more chlorine atoms attached to a saturated carbon atom or atoms may be employed in the practice of this invention. Chlorinated compounds having substituents which are inert under conditions of autoxidation or inhibition may also be employed, such as phenacyl chloride. Specific chlorinated hydrocarbons, listed in approximate order of decreasing effectiveness as inhibitors, are triphenylmethyl chloride, t-butyl chloride, diphenylmethyl chloride, benzyl chloride, allyl chloride, and 1-chloropentane. Other chlorinated hydrocarbons may be exemplified by tris(p-tolyl)methyl chloride, alpha-chloromethylnaphthalene, 9-chloromethylanthracene, chlorocyclohexane, chlorocyclopentane, 2-chlorobutane, 1-chloro-1-phenylethane, 1-chloro-1,1-diphenylethane, 1-chloro-1-phenylcyclohexane, 1-chloro-1-phenyl-2-propene, and 1-chloro-2,4-pentadiene. As seen by the specific examples, chlorinated hydrocarbons having 3 to over 20 carbon atoms are illustrated; however, the chlorinated hydrocarbons may have 30 or more carbon atoms.

Under typical autoxidation conditions, some of the chlorinated hydrocarbons have been found to undergo extremely rapid reactions with metal autoxidation catalysts to produce insoluble metal chlorides which are not capable of catalyzing autoxidation. The inhibitory effectiveness of the chlorinated hydrocarbons, in general, is believed to be connected with their ability to undergo this type of metal scavenging reaction.

The synergistic system of the present invention utilizes a stabilizing amount of a chlorinated hydrocarbon together with a phenol. Suitable phenols are exemplified by phenol, o-cresol, p-cresol, m-cresol, hydroquinone, and 2,6-di-t-butyl-4-methylphenyl; bisphenols such as 4,4′-methylenebis(2,6-di-t-butylphenol) and 2,2′,6,6′-tetra-t-butyl-p,p′-bisphenyl; and trisphenols such as 1,1,3-tris(2-methyl-5-t-butyl-4-hydroxyphenyl)butane and 1,3,5-tris (3,5-di-t-butyl-4-hydroxybenzyl)-2,4,6-tri - methylbenzene. Thus, as exemplified by the specific examples, suitable phenols are monophenols, bisphenols, and trisphenols, and they may be present in an amount from about 0.01 to about 2.0 percent by weight. The phenol is more generally used in an amount from about 0.1 to about 1.0 percent by weight.

The present invention is fully illustrated by the following specific examples which illustrate the present invention and are not intended to limit the scope thereof.

Figure 2:
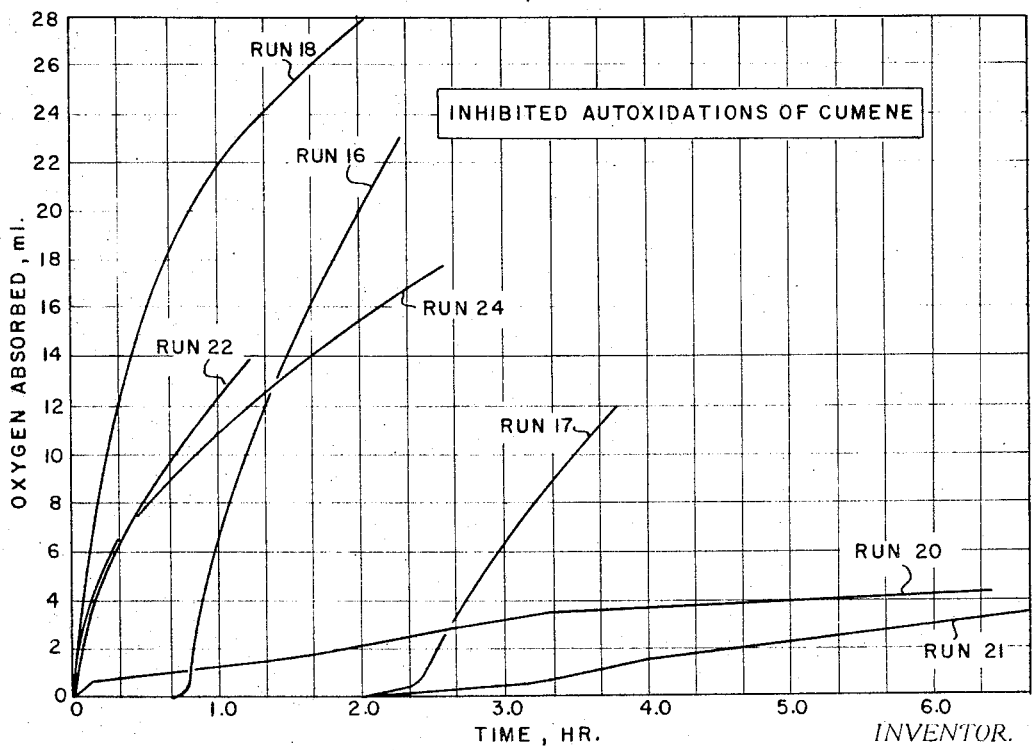
Figure 3:
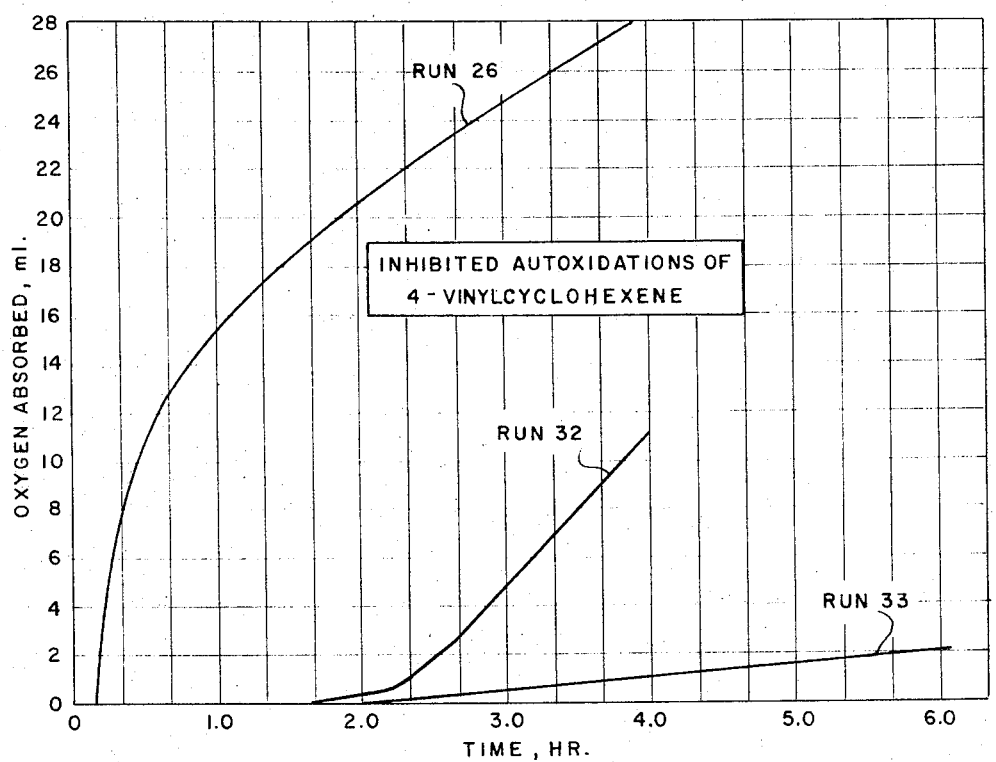

The ability of chlorinated hydrocarbons, more specifically the alkyl chlorides, the allyl chlorides and the aralkyl chlorides, to function as inhibitors for the transition metal-catalyzed autoxidation of hydrocarbons is shown by the data presented in Tables I and II, and in FIGS. 1, 2 and 3. The screening procedure used was a simple oxygen uptake test allowing for volumetric measurement of the amount of oxygen absorbed by the system as a function of time. The time elapsing prior to the onset of rapid (autocatalytic) oxidation is designated as the "induction period." In most cases no oxygen was absorbed during this period, while in a few runs the occurrence of a slow, continuous absorption of oxygen (either immediately or at a later stage) either eliminated the induction period entirely or made its precise measurement difficult. The compounds tested were triphenylchloromethane (A), diphenylchloromethane (B), benzyl chloride (C), allyl chloride (D), t-butyl chloride (E), and 1-chloropentane (F).

TABLE I.—INHIBITED AUTOXIDATIONS OF CUMENE [a]

| Run Number | Vol. percent cumene in benzene | Metal [b] (g.-atom×10^7) | Chloride (moles×10^5) | Ionol (moles×10^5) | Induction period, hr. | Comments |
|---|---|---|---|---|---|---|
| 1 | 82 | Co (2.0) | | 2.27 | [c] 0.15±0.05 | See Fig. 1. |
| 2 | 66 | Co (2.0) | | 2.27 | 0.1 | Oxidation rate comparable to rate for Run 1. |
| 3 | 66 | Co (2.0) | | | 0 | Do. |
| 4 | 82 | Co (2.0) | A (2.27) | | >19.7 | |
| 5 | 66 | Co (2.0) | B (136) | 2.27 | ~3.5–5.0 | 7.2 ml. O₂ absorbed after 22.1 hours. |
| 6 | 76 | Co (2.0) | B (45.4) | 2.27 | 0.8 | See Figure 1. |
| 7 | 81 | Co (2.0) | B (9.08) | 2.27 | 0.1 | Do. |
| 8 | 66 | Co (2.0) | C (272) | 2.27 | ~2–4 | 3.0 ml. O₂ absorbed after 19.7 hours. |
| 9 | 76 | Co (2.0) | C (90.7) | 2.27 | 0.1 | See Figure 1. |
| 10 | 81 | Co (2.0) | C (9.07) | 2.27 | 0.1 | Do. |
| 11 | 66 | Co (2.0) | D (272) | 2.27 | 0.1 | Do. |
| 12 | 76 | Co (2.0) | D (90.7) | 2.27 | 0.1 | Do. |
| 13 | 66 | Co (2.0) | D (90.7) | 2.27 | 0.1 | Do. |
| 14 | 66 | Co (2.0) | E (27.2) | | >21.7 | Do. |
| 15 | 66 | Co (2.0) | E (27.2) | 2.27 | 0 | |
| 16 | 82 | Mn (2.2) | | 2.27 | [c] 0.6±0.1 | See Figure 2. |
| 17 | 76 | Mn (2.2) | | 2.27 | [d] 1.9±0.5 | Do. |
| 18 | 82 | Mn (2.2) | | | 0 | Do. |
| 19 | 82 | Mn (2.2) | A (2.27) | | >19.5 | |
| 20 | 82 | Mn (2.2) | D (90.7) | | 0 | Do. |
| 21 | 76 | Mn (2.2) | D (90.7) | 2.27 | ~2 | Do. |
| 22 | 81 | Mn (2.2) | E (18.1) | | 0 | Do. |
| 23 | 81 | Mn (2.2) | E (18.1) | 2.27 | >19.8 | |
| 24 | 82 | Mn (2.2) | F (90.7) | | 0 | Do. |
| 25 | 76 | Mn (2.2) | F (90.7) | 2.27 | >20.0 | |

[a] 50° C., pure O₂ at 1 atm. total pressure (including vapor pressure of reaction mixture), 2.64×10⁻⁴ mole t-butyl hydroperoxide.
[b] Cobalt or manganese naphthenate.
[c] Average of three runs.
[d] Average of two runs.

TABLE II.—INHIBITED AUTOXIDATIONS OF 4-VINYLCYCLOHEXENE (VCH) [a]

| Run Number | Vol. percent VCH in benzene | Metal [b] (g.-atom×10^7) | Chloride (moles×10^5) | Ionol (moles×10^5) | Induction period, hr. | Comments |
|---|---|---|---|---|---|---|
| 26 | 82 | Co (2.0) | | 2.27 | [c] 0.15±0.05 | See Figure 3. |
| 27 | 66 | Co (2.0) | | 2.27 | [d] 0.65±0.15 | |
| 28 | 82 | Co (2.0) | A (2.27) | | ~2.5–3 | 1.8 ml. O₂ absorbed after 8.7 hours. |
| 29 | 76 | Co (2.0) | A (2.27) | 2.27 | >21.1 | |
| 30 | 66 | Co (2.0) | A (6.81) | 2.27 | >21.2 | |
| 31 | 66 | Co (2.0) | B (136) | 2.27 | 2.7–3.9 | |
| 32 | 82 | Mn (2.2) | | 2.27 | [d] 1.6±0.4 | See Figure 3. |
| 33 | 82 | Mn (2.2) | A (2.27) | | ~2.2 | Do. |

[a] 50° C., pure O₂ at 1 atm. total pressure (including vapor pressure of reaction mixture), 2.64×10⁻⁴ mole t-butyl hydroperoxide.
[b] Cobalt or manganese naphthenate.
[c] Average of nine runs.
[d] Average of two runs.

Runs 1–3, 16–18, 26, 27, and 32 are control runs carried out to determine induction periods and oxidation rates in the presence of a typical hindered alkylphenol (Ionol, i.e. 2,6-di-t-butyl-4-methylphenol), or in the absence of any inhibitors. The effects of diluting the oxidizable substrates (cumene and 4-vinylcyclohexene) with various amounts of benzene are also shown by the control runs. Oxidation rate curves for all replicate runs were essentially identical, except for the indicated variations in induction periods. In several cases (Runs 4, 15, 19, 23, 25, 29, and 30), the experiments were arbitrarily terminated before any detectable oxygen uptake occurred.

Runs 4, 19, 28, and 33 show that triphenylchloromethane is an extremely effective inhibitor for the cobalt- or manganese-catalyzed autoxidation of cumene or 4-vinylcyclohexene. Mixtures of triphenylchloromethane and Ionol act as synergistic systems (Runs 29 and 30). Runs 5–7 and 31 show that mixtures of diphenylchloromethane and Ionol are much more effective than Ionol alone. Mixtures of benzyl chloride and Ionol (Runs 8–10) are also considerably more effective than Ionol. Allyl chloride is an effective inhibitor when used alone (Run 20) or with Ionol (Runs 11–13, and 21). Runs 14 and 22 show that t-butyl chloride is effective alone; Runs 15 and 23 show that mixtures of t-butyl chloride and Ionol are strongly synergistic. 1-chloropentane is also effective alone (Run 24) and synergistic with Ionol (Run 25).

The nature and object of the present invention having been completely described and illustrated and the best mode thereof contemplated set forth, what I wish to claim as new and useful and secure by Letters Patent is:

I claim:
1. A composition which comprises: an autoxidizable hydrocarbon substrate containing a metal ion selected from the group consisting of titanium, vanadium, chromium, manganese, iron, cobalt, nickel, copper, molybdenum, tungsten and lead which acts as an autoxidation catalyst, and at least a stoichiometric amount equal to the amount of metal ion present of a triarylmethyl chloride.

2. A composition according to claim 1 wherein said triarylmethyl chloride is triphenylmethyl chloride.

3. A method for reducing autoxidation initiated by a metal ion which acts as an autoxidation catalyst in hydrocarbon substrates at less than 50° C. which comprises: adding to said autoxidizable hydrocarbon substrate containing said metal ions a stoichiometric amount equal to the amount of ions present of a chlorinated hydrocarbon selected from the group consisting of triaralkyl chlorides, diaralkyl chlorides, allyl chlorides, and t-butyl chloride.

4. A method according to claim 3 wherein said chlorinated hydrocarbon is a triarylmethyl chloride.

5. A method according to claim 3 wherein said chlorinated hydrocarbon is t-butyl chloride.

6. A method according to claim 3 wherein said chlorinated hydrocarbon is diphenylmethyl chloride.

7. A method according to claim 3 wherein said substrate is an olefinic hydrocarbon.

8. A method according to claim 3 where substrate is an alkylaromatic hydrocarbon.

9. A method according to claim 3 which comprises adding in addition a stabilizing amount of a phenol.

10. A method according to claim 4 which comprises adding in addition a stabilizing amount of a phenol.

References Cited
UNITED STATES PATENTS

| | | | |
|---|---|---|---|
| 1,313,158 | 8/1919 | Backhaus | 44—79X |
| 2,214,768 | 9/1940 | Lincoln | 44—9 |
| 2,479,902 | 8/1949 | Calingaert et al. | 252—386 |
| 2,591,503 | 4/1952 | Bottoms | 44—68 |
| 2,608,476 | 8/1952 | Strickland | 44—69 |
| 2,622,671 | 12/1952 | Johnson | 158—117.5 |
| 2,631,929 | 3/1953 | Thorpe et al. | 44—79 |
| 2,869,993 | 1/1959 | Lyben | 44—69 |

DELBERT E. GANTZ, Primary Examiner

G. E. SCHMITKONS, Assistant Examiner

U.S. Cl. X.R.

44—79; 203—9; 208—47, 48; 252—399